United States Patent
Hilliard

(10) Patent No.: US 7,104,157 B1
(45) Date of Patent: Sep. 12, 2006

(54) MOTORCYCLE FOOTRESTS

(76) Inventor: Terry L. Hilliard, 6853 Fostoria Rd., Otter Lake, MI (US) 48464

( * ) Notice: Subject to any disclaimer, the term of this patent is extended or adjusted under 35 U.S.C. 154(b) by 228 days.

(21) Appl. No.: 10/869,295

(22) Filed: Jun. 16, 2004

Related U.S. Application Data

(60) Provisional application No. 60/470,986, filed on Jul. 25, 2003.

(51) Int. Cl.
*G05G 1/18* (2006.01)

(52) U.S. Cl. ..................... 74/564; 280/291

(58) Field of Classification Search ............ 74/564, 74/560, 594.1, 594.4; 296/75; 280/291, 280/47.4, 87.402
See application file for complete search history.

(56) References Cited

U.S. PATENT DOCUMENTS

| | | | | |
|---|---|---|---|---|
| 4,174,852 A * | 11/1979 | Panzica et al. | ............ | 280/291 |
| 4,546,993 A * | 10/1985 | Walker | ............ | 280/291 |
| 5,482,307 A * | 1/1996 | Lin | ............ | 280/291 |
| 5,826,900 A * | 10/1998 | Steele | ............ | 280/291 |
| 6,152,474 A * | 11/2000 | Rupert | ............ | 280/291 |
| 6,170,842 B1 * | 1/2001 | Mueller | ............ | 280/163 |
| D487,235 S * | 3/2004 | Thomas et al. | ............ | D12/114 |
| 6,969,083 B1 * | 11/2005 | Egan | ............ | 280/291 |
| 6,981,713 B1 * | 1/2006 | Lindby | ............ | 280/291 |

\* cited by examiner

*Primary Examiner*—Richard Ridley
*Assistant Examiner*—William Windley, III
(74) *Attorney, Agent, or Firm*—Robert L. Farris

(57) ABSTRACT

The motorcycle footrest includes a mounting block and a footrest plate. The mounting block is clamped to a crash bar secured to a motorcycle frame. A pivot pin pivotally connects an end of the footrest plate to the mounting block for pivotal movement about a pivot pin bore axis that extends upwardly and forwardly at an angle of 45° from a horizontal plane. The footrest plate has a first footrest surface and a second footrest surface that are parallel to each other and face in opposite directions. Stop surfaces on the mounting block limit pivotal movement of the footrest plate when the first footrest surface is in a use position and when the second footrest surface is in a use position. At least one aperture passes through the footrest plane and intersects the first and second footrest surfaces. An aperture insert is mounted in the aperture.

20 Claims, 5 Drawing Sheets

«page 1»
MOTORCYCLE FOOTRESTS

This disclosure incorporates the Motorcycle Footrests disclosed in Provisional Patent Application 60/470,986 filed Jul. 25, 2003, whose priority is claimed for this application.

FIELD OF THE INVENTION

The motorcycle footrests are clamped to motorcycle crash bars at selected elevations and are shiftable between an inboard position and an outboard position.

BACKGROUND OF THE INVENTION

Footrests that clamp to the crash bars on motorcycles have been used for many years. Some of the footrests are clamped in a selected fixed position and remain in that position at all times. To provide a flat shoe contact surface at the required angle for a person sitting on the seat of the motorcycle, it has generally been necessary to have a left side footrest and a right side footrest.

Motorcycle operators may decide to move footrests to a storage position when they are not in use. To accommodate the requirement, footrests that are moveable between a use position and a storage position have been constructed. These footrests do not provide two different use positions.

Motorcycles have an engine that produces heat, located between the operator's legs. With the exception of ambient air, motorcycles do not have air conditioning. To improve comfort, control temperature and avoid fatigue during extended trips, operators of motorcycles find it convenient to rest their feet in three or more different positions. One position is at the side of the engine and near the ground. A second position is on footrests attached to crash bars and extending inward toward the motorcycle from the attachments to the crash bars. A third position is footrests attached to the crash bars and extending outward away from the motorcycle and the attachments to the crash bars. In the first position, the operator's feet are well below the operator's knees and close to the engine. In the second position, the operator's feet are well forward of the knees, each knee joint is bent less, and the distance between the feet and the engine is increased from the distance when in the first position. In the third position, the operator's feet are laterally spread apart further, the knee joints are bent a little less than when the feet are in the second position and the distance between the feet and the engine is increased from the distance when in the second position.

Footrests generally have a flat footrest surface that is at an angle to horizontal. The angle of the footrests places the footrest surface in a plane that is generally normal to the tibia. The footrests available in the past that have a flat footrest surface have a left side footrest and right side footrest. To obtain the third footrest position, in addition to the second footrest position, a second set of footrests is required. The second set of footrests must be attached to the crash bars below or above the first set. Both inside footrests are generally at one common elevation. Both outside footrests are generally at a common elevation and either above or below the inside footrests.

SUMMARY OF THE INVENTION

The motorcycle footrest includes a mounting block with a pivot pin bore. The pivot pin bore has a pivot pin bore axis that intersects a horizontal plane at an angle of about forty-five degrees. A first mounting block stop surface and a second mounting block stop surface are on the mounting block. A clamp member is attached to the mounting block and clamps the mounting block to a motorcycle crash bar. The pivot pin bore axis is held in a vertical plane that is substantially parallel to a direction of forward movement. A footrest plate includes a first footrest surface and a second footrest surface that faces away from the first footrest surface. A first step surface and a second step surface are provided on the footrest plate. A footrest pivot pin bore is in the footrest plate adjacent to an end of the footrest plate. At least one aperture through the footrest plate passes through the first footrest surface and the second footrest surface. At least one aperture insert member is received in the at least one aperture. At least one retainer retains the at least one insert member in the at least one aperture. A pivot pin is received in the pivot pin bore and in the footrest pivot pin bore. The footrest plate is pivotable about a pivot pin axis to a first footrest plate position in which the first stop surface on the footrest plate rests on the first mounting block stop surface and the first footrest surface is in a first use position. The footrest plate is also pivotable about the pivot pin axis to a second footrest plate position in which the second stop surface on the footrest plate rests on the second mounting block stop surface and the second footrest surface is in a second use position.

BRIEF DESCRIPTION OF THE DRAWINGS

These and other objects, features and advantages of this invention will become readily apparent in view of the following detailed description of the preferred embodiments and best mode, appended claims and accompanying drawings, in which:

DETAILED DESCRIPTION OF THE PREFERRED EMBODIMENT

Figure 6:
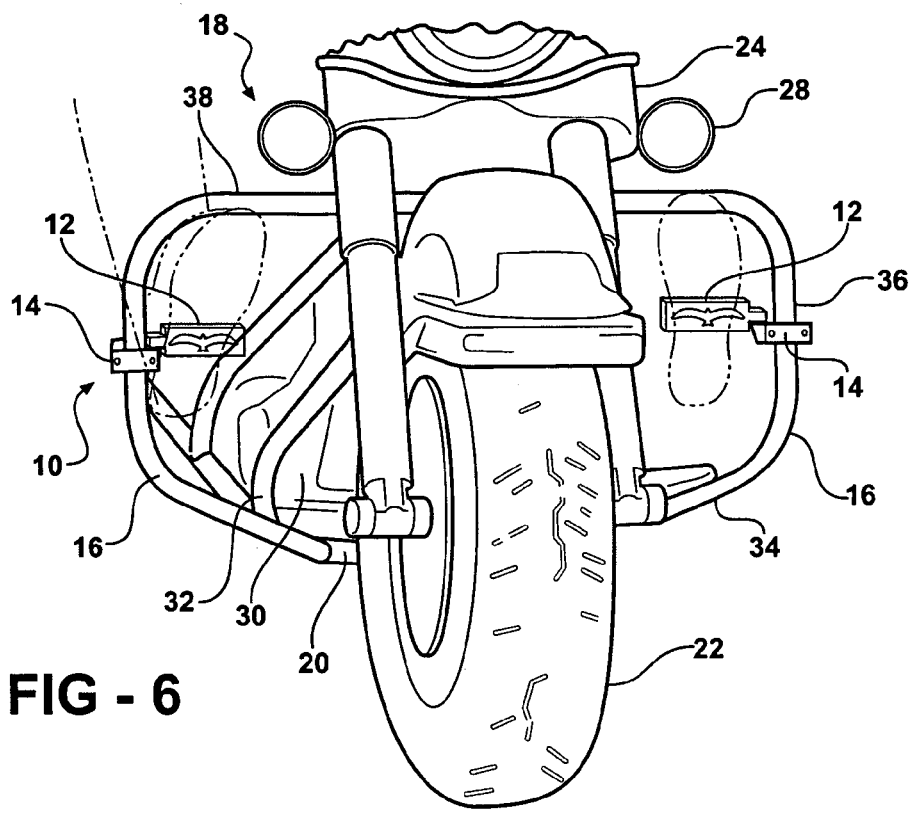
FIG. 6 is a perspective view of a pair of motorcycle foot rests on a motorcycle in inboard positions.
Figure 7:
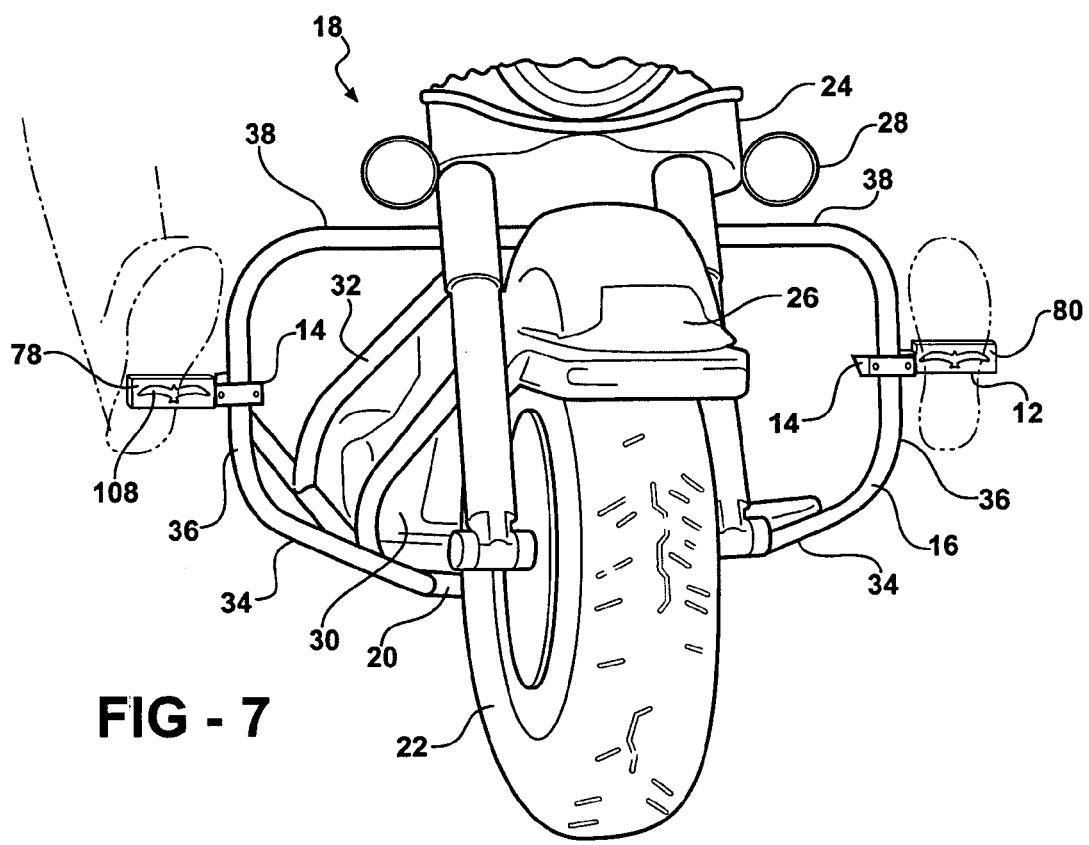
FIG. 7 is a perspective view of a pair of motorcycle foot rests on a motorcycle in outboard positions.

The motorcycle footrest assembly 10 includes a footrest plate 12 and a mounting assembly 14. The footrest assembly 10 is connectable to crash bars 16 of a motorcycle 18, as shown in FIGS. 6 and 7. The motorcycle crash bar 16 is a steel tube attached to the motorcycle frame 20 to the rear of the front tire and wheel 22 and the steering fork assembly 24. The front tire and wheel 22 is journaled on the steering fork assembly 24 for rotation about a transverse horizontal axis. The steering fork assembly 24 is pivotally connected to the frame 20. A front fender 26 and lights 28 are carried by the fork assembly 24. A motor 30, with exhaust pipes 32, is mounted on the frame 20 to the rear of the crash bar 16.

Crash bars 16 vary in shape and construction depending upon the size of the motorcycle 18, the construction of the frame 20 and the manufacturer's design. Some small motorcycles do not have crash bars 16. The crash bars 16, on motorcycles 18 that employ them, have a lower portion 34 that extends outward and upward from the frame 20, an integral center portion 36 that extends generally upward from the lower portion, and an integral upper portion 38 that extends generally laterally inward to the frame. The right side crash bar 16 and the left side crash bar have substantially the same construction. The same reference numbers have therefore been used for the crash bars 16 on both sides of the motorcycle 18. The integral portion 36 may extend straight up, up and to the front, or up and to the rear. The mounting assembly 14 can be modified to accommodate such variations as well as changes in the diameter of the pipe used in the construction as explained below. The motorcycle footrest assembly 10 on the right side is identical to the footrest assembly on the left side.

The mounting assembly 14 includes a mounting block 40 and a block cap 42. The mounting block 40 is a stainless steel block with a mounting block upper ear 44 and a mounting block lower ear 46. A footrest pivot pin ear bore 48 is drilled through the mounting block ears 44 and 46. The ear bore 48 had a pivot pin bore axis 50 that is in a vertical plane parallel to the forward direction of travel of the motorcycle 18 and extends upwardly and forward at an angle of 45° to a horizontal plane. A left detent receiver bore 52 and a right detent receiver bore 54 are drilled through the upper ear 44. A footrest plate stop surface 56 extends between and to both sides of the upper ear 44 and the lower ear 46 and provides a left stop surface 56L and a right stop surface 56R. A pair of threaded bores 58 are provided through the mounting block 40. The block cap 42 has two cap bores 60 with counterbores 62. Capscrews 64 are inserted through the bores 60 and their threaded shanks 66 are screwed into the threaded bores 58. The capscrew heads 68 are received in the counterbores 62. A crash bar pipe passage 70 is provided through the junction between the mounting block 40 and the block cap 42. The axis of the passage is coaxial with the axis of the crash bar 16 and preferably positions the pivot pin bore axis 50 at an angle of 45° from horizontal. This pipe passage 70 through the mounting assembly 14 accommodates the angle of the center portion 36 of the crash bar 16. The passage 70 must be sized for the mounting assembly 14 to clamp securely to the crash bar 16. This is accomplished by machining the mounting block mating surfaces 72 and the block cap mating surfaces 74 to provide an interference fit on the crash bar 16. The crash bars 16 are made from thick wall steel tubing that is chrome-plated. The diameter of the tube 36 is reasonably accurate. The thickness of the chrome plating also has a substantially uniform thickness. The mating surfaces 72 and 74 are shown in the drawing at an angle of less than 90° relative to the axis of the pipe passage so that the cap mating surface 74 can slide down the block mating surface 72 a short distance and increase the clamp force on the crash bar 16. In view of the fact that most crash bars with chrome plating that are in use today have one of three different nominal diameters and the actual diameters of the crash bars with one nominal diameters have substantially uniform diameters, it is not necessary to have the mating surfaces 72 and 74 in planes that intersect the bore axis 120. An alternate and preferred construction has mating surfaces 72 and 74 that are in a common plane with the bore axis 120. The cap mating surfaces 74 have from ten-thousandths to thirty-thousandths of an inch of material removed so that the cap 42 exerts a substantial compression force on the crash bar 16 when the capscrews 64 are properly tightened. As a result of moving material from the mating surfaces 74, the pipe passage 70 has a slightly smaller diameter along a line parallel to the capscrews 64. The diameter of the pipe passage 70 in a plane including the mating surfaces 72 and 74 is substantially the same as the diameter of the crash bar 16.

The footrest plate 12 is a stainless steel member with a footrest surface 78 on one side and a footrest surface 80 on the other side. The surfaces 78 and 80 are in parallel planes as shown. A foot retainer flange 82 is integral with the free end of the footrest plate 12. The flange 82 limits sliding movement of a shoe or boot off the free end and off the footrest surface 78 or footrest surface 80. A pivot block 84 is integral with the pivot end of the footrest plate 16 and a pivot end flange 86. The pivot end flange 86 limits sliding movement of a shoe or boot toward the mounting block 40 and cooperates with the flange 82 to keep the foot of an operator of a motorcycle on the footrest surface 78 or the footrest surface 80.

Figure 1:
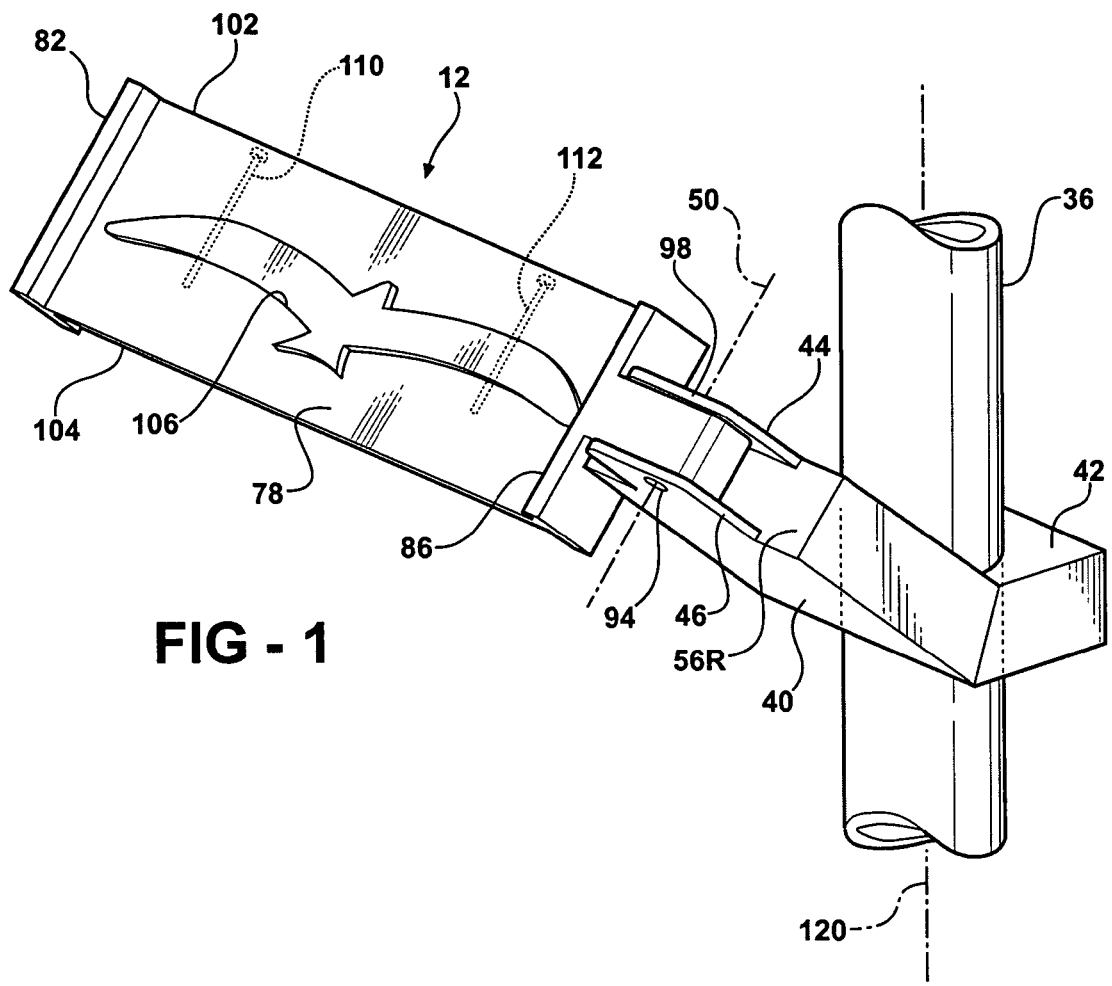
FIG. 1 is a perspective view of the motorcycle foot rest and the mounting assembly mounted on a motorcycle crash bar with parts broken away.
Figure 4:
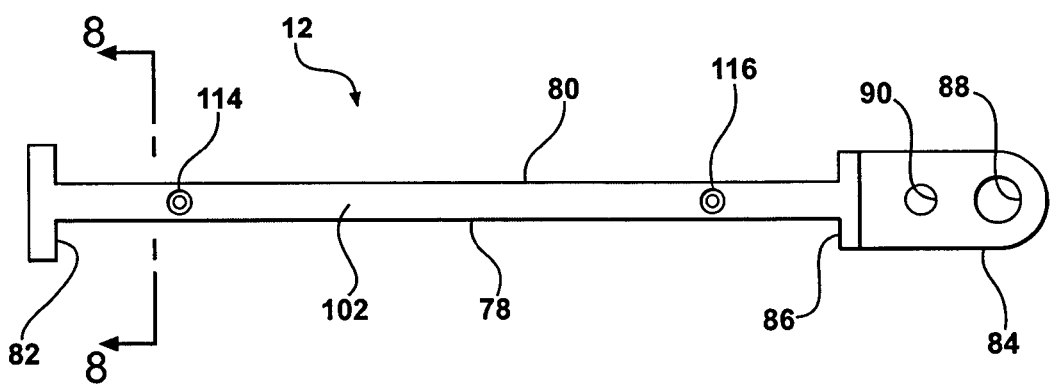
FIG. 4 is a top plan view of the motorcycle foot rest separate from a mounting assembly.
Figure 2:
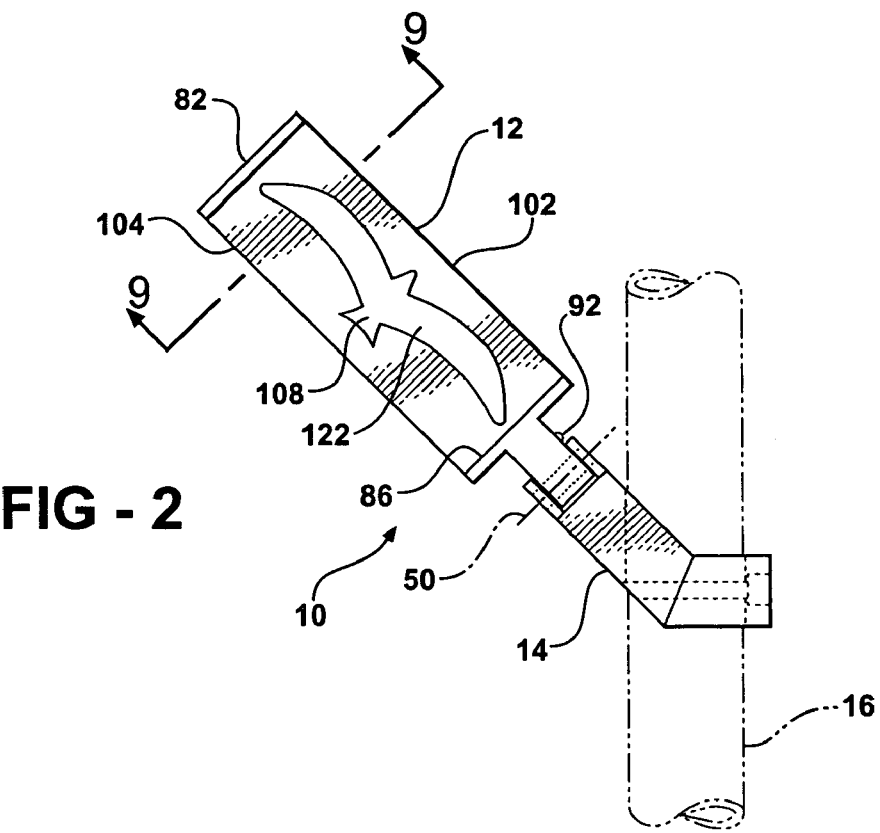
FIG. 2 is an elevational view of the motorcycle foot rest mounted on a motorcycle crash bar with parts broken away and the footrest in a non-use position.
Figure 3:
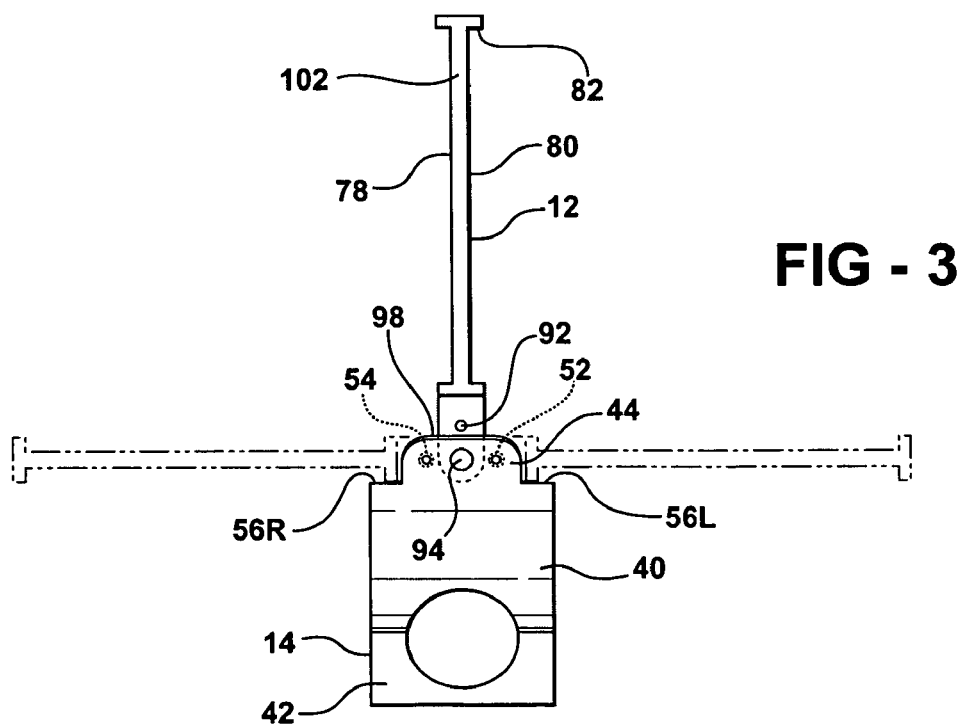
FIG. 3 is a top view parallel to the pivot pin bore axis of the motorcycle foot rest and the mounting assembly with the motorcycle foot rest in a non-use position and shown in broken lines in an outside position and in an inside position relative to the mounting assembly.
Figure 5:
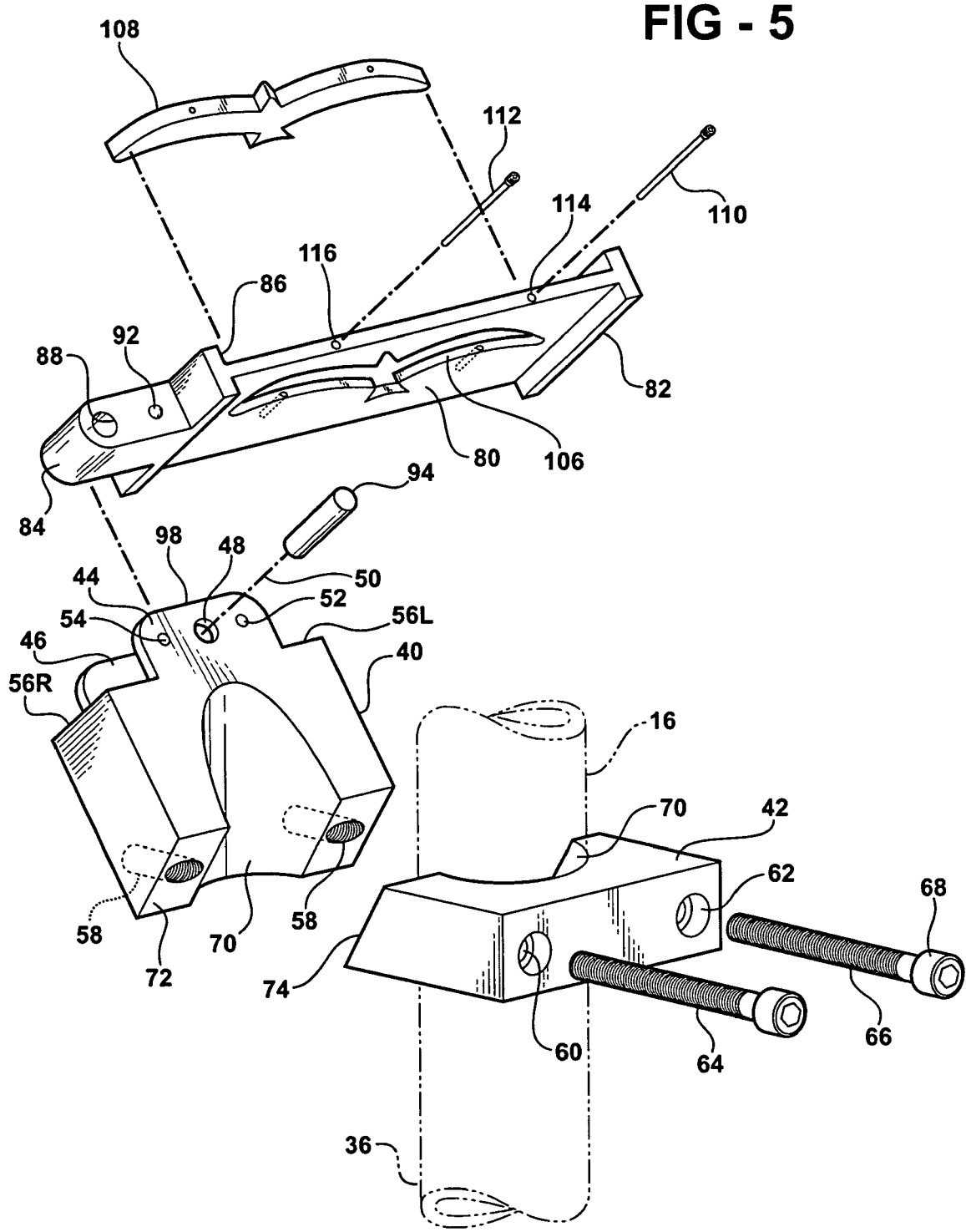
FIG. 5 is an expanded view of the motorcycle foot rest, the mounting assembly and a portion of a motorcycle crash bar in broken lines.

The pivot block 84 has a pivot pin bore 88 and a detent retainer bore 90. A spring loaded detent 92 is mounted in the detent bore 90. A detent assembly can be screwed in a threaded detent bore 90 or the detent bore 90 can be shaped to hold a detent 92 and a detent spring. A pivot pin 94 passes through pivot pin bore 88 and through pivot pin ear bore 48 through the footrest plate mounting block ears 44 and 46. The pivot pin 94 pivotally retains the pivot block 84 between the two block ears 44 and 46 on the mounting block assembly 14. The pivot pin 94 is pressed into the pivot pin bore 88 and held by the pivot block 84. Both ends of the pivot pin 94 are journaled in the footrest pivot pin ear bore 48 through the upper and lower ears 44 and 46. The force of a person's foot against the footrest surface 78 urges the footrest plate 16 in a clockwise direction about the pivot pin 94, as shown in FIG. 1. The pivot end flange foot retainer 86 contacts a stop surface 56L on the mounting block 40 and stops further clockwise rotation of the footrest plate 12. The stop surface 56 includes a left side stop surface 56L and a right side stop surface 56R. The detent 92 in the detent retainer bore 90 engage the detent receiver bore 52, when the flange 86 is in contact with the stop surface 56L and resist counterclockwise pivotal movement of the footrest plate 12. A moderate clockwise force on the plate 12 will release the detent 92 from the left detent receiver bore 52 and free the footrest plate 12 for counterclockwise rotation about the pivot pin 94. The force of a person's foot against the footrest surface 80 urges the footrest plate 16 in a counterclockwise direction about the pivot pin 94, as shown in FIG. 3. The flange 86 contacts a stop surface 56R on the mounting block 40 and stops further counterclockwise rotation of the footrest plate 12. The detent 92 in the detent retainer bore 90 engage the detent receiver bore 54 when the flange 86 is in contact with the stop surface 56R and resists clockwise movement of the footrest plate 12. A moderate counterclockwise force on the plate 12 will release the detents 92 and free the plate for clockwise rotation about the pivot pin 94.

The footrest plate 12 can be left in a position extending directly to the rear as shown in continuous lines in FIG. 3, when not being used as a footrest. The spring loaded detent 92 will contact the edge 98 of the upper ear 44 on the mounting block 40 to hold the footrest plate 12 in a non-use position. The footrest plate 12 can be pivoted about the axis of the pin 94 in a clockwise or counterclockwise direction to a use position as shown in broken lines in FIG. 3.

The footrest surfaces 78 and 80 of the stainless steel footrest plate 16 are relatively slick. The flanges 82 and 86 limit movement of boots and shoes to the outside and away from the motorcycle engine 30 as well as to the inside and toward the engine. The upper edge 102 and the lower edge 104 resist vertical movement of boots and shoes relative to the footrest plate 12. Vertical movement of an operator's foot can be further resisted by cutting an aperture 106 in the footrest plate 12 that extends through both footrest surfaces 78 and 80 and then mounting a footrest plate aperture insert 108 in the aperture that extends a short distance out of both footrest surfaces. The aperture insert 108 has a thickness that exceeds the distance between the footrest surfaces 78 and 80. Resistance to vertical movement can also be increased by an aperture 106 and an aperture insert 108 mounted in the aperture that is recessed into the aperture. The aperture insert 108 may be recessed into the footrest surface 78 and extend out of footrest surface 80 for example. The aperture insert 108 in the aperture 106 in the drawings is a silhouette of an eagle in flight. The insert 108 can take different forms. It can, for example, be a trademark or a person's name, rather than an animal.

Figure 8:
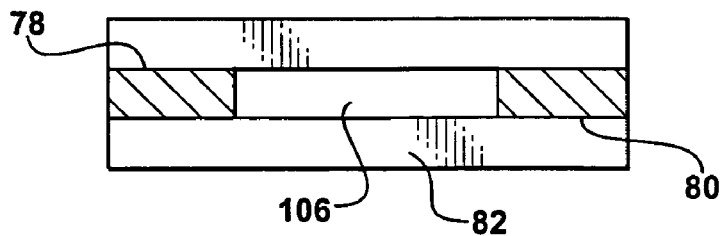
FIG. 8 is a sectional view taken along line 8—8 in FIG. 4 showing the foot rest plate and aperture without an aperture insert.
Figure 9:
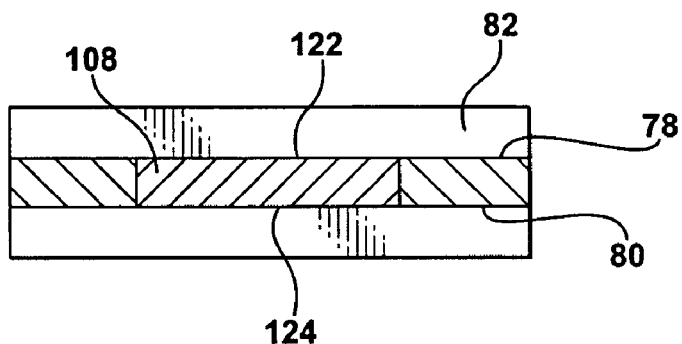
FIG. 9 is a sectional view taken along line 9—9 in FIG. 2 showing an aperture insert with faces that are in the same plane as the footrest surface.
Figure 10:
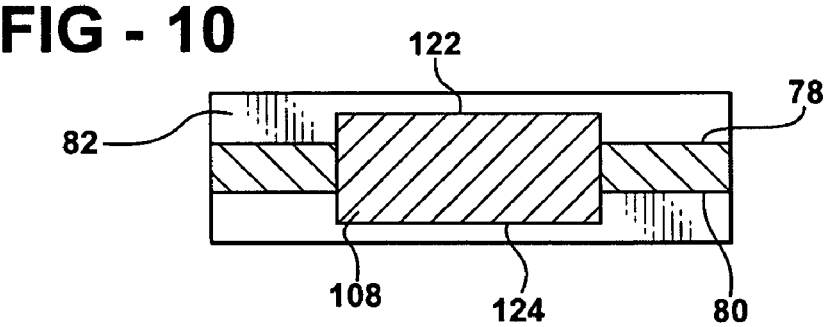
FIG. 10 is a sectional view similar to FIG. 9 showing an aperture insert with faces that extend outside of the aperture.
Figure 11:
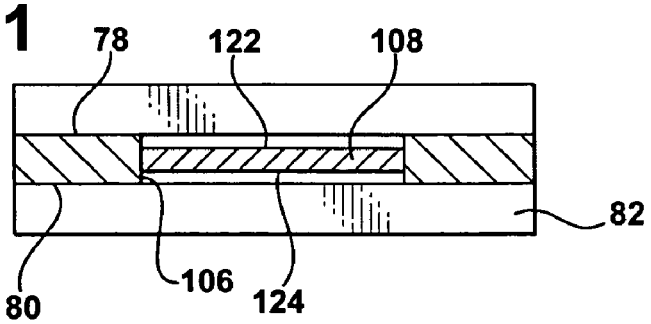
FIG. 11 is a sectional view similar to FIG. 9 showing an aperture insert with faces that are recessed into the aperture.

The aperture insert 108 is substantially the same shape as the aperture 106. If the footrest plate 12 is stainless steel the aperture insert 108 inserted into the aperture may also be stainless steel or the aperture insert can be a material such as brass, gold, silver, ceramic, plastic, rubber, marble or some other suitable material. The aperture insert 108 has a first surface 122 and second face surface 124. The face surfaces 122 and 124 may be in the same plane as the footrest surfaces 78 and 80 as shown in FIG. 9. The aperture insert 108 may extend out of both ends of the aperture 106 as explained above and shown in FIG. 10. Under most circumstances the aperture insert that extends outwardly from the footrest surfaces 78 and 80 will provide substantial slip resistance. An aperture insert 108 that is recessed into the aperture 106 as shown in FIG. 11 may provide substantial slip resistance. An aperture 106 without an insert as shown in FIG. 8 may also provide substantial slip protection if the aperture 106 is shaped and sized to provide edge surfaces that engage and hold footwear.

The preferred method of creating the bar 108 is to cut a desired shape from a stainless steel block by water jet machining, electron discharge machining or a similar metal cutting system, and removing the shape from the block. The footrest surfaces 78 and 80 are then machined to form the foot retainer flange 82 and pivot end foot retainer flange 86. The insert 108 is then reinserted into the aperture 106. Retainer pin 110 is inserted into bore 114 and retainer pin 112 is inserted into bore 116. The retainer pins 110 and 112 can be threaded retainers, roll pins, or wire members. The bores 114 and 116 may be formed before the aperture 106 is formed. The insert 108 formed by this procedure protrudes from both footrest surfaces 78 and 80, thereby providing an attractive boot and shoe slip resisting member.

The motorcycle footrest assembly 10 on the left side of the motorcycle 18 is identical to the footrest assembly on the right side of the motorcycle. The mounting assembly 14 on the left side of a motorcycle 18 is identical to the mounting assembly on the right side of the same motorcycle. The angle of the bore axis 120 of the crash bar pipe passage 70 may change from one motorcycle manufacturer to another. The diameter of the crash bar pipe passage 70 may also change from one motorcycle manufacturer to another. These changes may also occur from one motorcycle model to another. Each mounting assembly 14 will therefore be manufactured for use on specific motorcycles 18. The footrest plate 12 will fit on all mounting assemblies 14. The design of the aperture 106 and the footrest plate aperture insert 108 can be selected by each owner of a motorcycle 18.

I claim:

1. A motorcycle footrest comprising:
   a mounting block including a pin bore with a pivot pin bore axis that intersects a horizontal plane at an angle of about forty-five degrees, a first mounting block stop surface on the mounting block, a second mounting block stop surface on the mounting block, and a clamp member attached to the mounting block for clamping the mounting block to a motorcycle crash bar and holding the pivot pin bore axis in a vertical plane that is substantially transverse to a motorcycle front wheel axis of rotation during forward motorcycle movement;
   a footrest plate including a first footrest surface, a second footrest surface facing away from the first footrest surface, a first stop surface on the footrest plate, a second stop surface on the footrest plate, and a footrest pivot pin bore in the footrest plate adjacent to an end of the footrest plate;
   a pivot pin received in the pivot pin bore and in the footrest pivot pin bore; and
   wherein the footrest plate is pivotable about a pivot pin axis between a first footrest plate position in which the first stop surface on the footrest plate rests on the first mounting block stop surface and first footrest surface is in a first use position, and a second footrest plate position in which the second stop surface on the footrest plate rests on the second mounting block stop surface and the second footrest surface is in a second use position.

2. A motorcycle footrest, as set forth in claim 1, wherein the first footrest surface and the second footrest surface are parallel to each other.

3. A motorcycle footrest, as set forth in claim 1, including at least one aperture in the footrest plate that passes through the first footrest surface and second footrest surface.

4. A motorcycle footrest, as set forth in claim 3, including at least one aperture insert member received in the at least one aperture and at least one retainer retaining the at least one aperture insert member in the at least one aperture.

5. A motorcycle footrest, as set forth in claim 4, wherein the at least one aperture insert member extends from both ends of the at least one aperture.

6. A motorcycle footrest, as set forth in claim 4, wherein the at least one insert member fills the at least one aperture and one face surface of the at least one aperture insert member, is substantially flush with the first footrest surface and another face surface of the at least one aperture insert member is substantially flush with the second footrest surface.

7. A motorcycle footrest, as set forth in claim 4, wherein the at least one aperture insert member includes a first face surface that is recessed in the at least one aperture.

8. A motorcycle footrest, as set forth in claim 4, wherein at least one aperture insert member is made from a different material than the footrest plate.

9. A motorcycle footrest comprising:
a mounting block including a pivot pin bore with a pivot pin bore axis that is at an angle of about forty-five degrees from a horizontal plane, a first mounting block stop surface that is parallel to the pivot pin bore axis, a second mounting block stop surface that is parallel to the pivot pin bore axis, and a clamp member, for clamping the mounting block to a motorcycle crash bar, that holds the pivot pin bore axis in a vertical plane that is parallel to the forward direction of travel;
a footrest plate including a first footrest surface in a first footrest plane, a second footrest surface in a second footrest plane, a first stop surface on the footrest plate, a second stop surface on the footrest plate, and a footrest pivot pin bore adjacent to an end of the first footrest surface;
a pivot pin received in the footrest pivot pin bore and in the pivot pin bore; and
wherein the footrest plate is pivotable about a pivot pin axis between a first plate position in which the first stop surface on the footrest plate rests on the first mounting block stop surface and the first footrest surface is in a first use position, and a second plate position in which the second stop surface on the footrest plate rests on the second mounting block stop surface and the second footrest surface in a second use position.

10. A motorcycle footrest, as set forth in claim 9, wherein the first mounting block stop surface and the second mounting block stop surface are in a common plane.

11. A motorcycle footrest, as set forth in claim 9, wherein the pivot pin bore passes through an upper ear and a lower ear of the mounting block and the end of the footrest plate with the footrest pivot pin bore is between the upper ear and the lower ear.

12. A motorcycle footrest, as set forth in claim 11, wherein the footrest pivot pin bore passes through a pivot block fixed to an end of the footrest plate and the pivot block is positioned between the upper ear and the lower ear.

13. A motorcycle footrest, as set forth in claim 9, including an aperture through the first footrest surface and the second footrest surface.

14. A motorcycle footrest, as set forth in claim 13, wherein an aperture insert is inserted into the aperture, extends out of at least one end of the aperture, and is releasably secured in the aperture by at least one retainer.

15. A motorcycle footrest, as set forth in claim 13, wherein the aperture insert has a decorative shape.

16. A motorcycle footrest, as set forth in claim 9, wherein the first footrest plane and the second footrest plane are parallel to each other.

17. A motorcycle footrest, as set forth in claim 16, including an aperture passing through the first footrest surface and the second footrest surface;
an aperture insert, with the same shape as the aperture, mounted in the aperture extending outward from the first footrest surface, and extending outward from the second footrest surface; and
at least two retainer pins fixing the aperture insert relative to the footrest plate.

18. A motorcycle footrest, as set forth in claim 11, including a detent that resists movement of the footrest plate from the first mounting block stop surface, and that resists movement of the footrest plate from the second mounting block stop surface.

19. A motorcycle footrest, as set forth in claim 9, including a free end foot retainer flange integral with a free end of the footrest plate; and
a pivot end foot retainer flange integral with the footrest plate.

20. A motorcycle footrest comprising:
a mounting block including a pivot pin bore with a pivot pin bore axis that intersects a horizontal plane at an angle of about forty-five degrees, a first mounting block stop surface on the mounting block, a second mounting block stop surface on the mounting block, and a clamp member attached to the mounting block for clamping the mounting block to a motorcycle crash bar and holding the pivot bore axis in a vertical plane that is substantially parallel to a direction of forward movement;
a footrest plate including a first footrest surface, a second footrest surface facing away from the first footrest surface, a first stop surface on the footrest plate, a second stop surface on the footrest plate, and a footrest pivot pin bore in the footrest plate, adjacent to an end of the footrest plate;
at least one aperture in the footrest plate that passes through the first footrest surface and the second footrest surface, at least one aperture insert member received in the at least one aperture, and at least one retainer retaining the at least one insert member in the at least one aperture;
a pivot pin received in the pivot pin bore and in the footrest pivot pin bore; and
wherein the footrest plate is pivotable about a pivot pin axis between a first footrest plate position in which the first stop surface on the footrest plate rests on the first mounting block stop surface and the first footrest surface is in a first use position, and a second footrest plate position in which the second stop surface on the footrest plate rests on the second mounting block stop surface and the second footrest surface is in a second use position.

* * * * *